(12) United States Patent
Hazan (10) Patent No.: US 11,620,375 B2
(45) Date of Patent: Apr. 4, 2023

(54) MOBILE BEHAVIOMETRICS VERIFICATION MODELS USED IN CROSS DEVICES

(71) Applicant: International Business Machines Corporation, Armonk, NY (US)

(72) Inventor: Itay Hazan, Beer Sheva (IL)

(73) Assignee: International Business Machines Corporation, Armonk, NY (US)

( * ) Notice: Subject to any disclaimer, the term of this patent is extended or adjusted under 35 U.S.C. 154(b) by 970 days.

(21) Appl. No.: 16/253,251

(22) Filed: Jan. 22, 2019

(65) Prior Publication Data

US 2020/0233952 A1 Jul. 23, 2020

(51) Int. Cl.

| G06F 3/041 | (2006.01) |
|---|---|
| G06N 3/02 | (2006.01) |
| G06F 21/45 | (2013.01) |
| G06F 3/0481 | (2022.01) |
| G06F 3/04883 | (2022.01) |
| G06N 20/00 | (2019.01) |
| G06F 21/34 | (2013.01) |
| G06F 9/445 | (2018.01) |
| G06F 21/31 | (2013.01) |

(52) U.S. Cl.
CPC ............ *G06F 21/45* (2013.01); *G06F 3/0481* (2013.01); *G06F 3/04883* (2013.01); *G06F 9/445* (2013.01); *G06F 21/316* (2013.01); *G06F 21/34* (2013.01); *G06N 20/00* (2019.01)

(58) Field of Classification Search
None
See application file for complete search history.

(56) References Cited

U.S. PATENT DOCUMENTS

| 8,412,158 | B2 | 4/2013 | Forutanpour et al. |
|---|---|---|---|
| 8,941,466 | B2 | 1/2015 | Bayram et al. |
| 2012/0204257 | A1 | 8/2012 | O'Connell et al. |
| 2014/0247239 | A1 | 9/2014 | Jamshidi-Roudbari et al. |
| 2014/0300554 | A1 | 10/2014 | Samuel et al. |
| 2015/0169858 | A1 | 6/2015 | Tg et al. |
| 2016/0299628 | A1* | 10/2016 | Ribeiro ................ G06F 3/0447 |
| 2017/0161478 | A1* | 6/2017 | Stavrou ................ G06F 21/32 |
| 2017/0230363 | A1 | 8/2017 | Deutschmann et al. |
| 2018/0068098 | A1* | 3/2018 | Finzi ...................... G06F 21/31 |
| 2019/0007397 | A1* | 1/2019 | Goldberg ............. H04W 12/08 |

FOREIGN PATENT DOCUMENTS

| JP | 2019159960 A | * | 9/2019 |
|---|---|---|---|
| WO | 2015088537 | | 6/2015 |
| WO | 2016157075 | | 10/2016 |

* cited by examiner

*Primary Examiner* — Joseph P Hirl
*Assistant Examiner* — Aayush Aryal
(74) *Attorney, Agent, or Firm* — Roy S. Melzer (57) ABSTRACT

A method for calibrating user behavior based models, in order to enable user validation across different devices (i.e. known and unknown devices), comprising: receiving device usage data generated by monitoring user-device interactions on one or more user devices; employing a user behavior model based on the device usage data and a plurality of values of technical parameters of the one or more devices; receiving a plurality of values of technical parameters of an additional device; receiving device usage data by monitoring user-device interactions on the additional device; and analyzing the device usage data of the additional device by employing the user behavior model to validate an action held using the additional device.

17 Claims, 5 Drawing Sheets

MOBILE BEHAVIOMETRICS VERIFICATION MODELS USED IN CROSS DEVICES

BACKGROUND

The present invention, in some embodiments thereof, relates to behavior biometrics and, more specifically, but not exclusively, to mobile behavior biometric verification models.

Mobile smartphones and tablets are in wide global usage, and serve users for accessing security sensitive services such as online payments, banking, and registration to service providers via mobile device applications and/or websites.

One type of solution to verify user identity for accessing security sensitive services may be implemented by user passwords, user fingerprints read from a dedicated sensor, or by 2-factor authentication methods. A major drawback is once a user identity is verified, it is not possible to know whether the user is the same throughout a session. Another type of solution which addresses the issue, and may be used as augmentation to the former solution type, is continuous mobile verification, which verifies user identity throughout a session, and between sessions. An efficient method to implement continuous mobile verification is by monitoring user-device interactions by monitoring touchscreen sensors. Touchscreen sensors often include sensors which record finger(s) position on a touchscreen, and size and pressure of the finger(s) interaction with the touchscreen. Models for mobile behavior biometrics often learn user-device interaction by learning specific patterns of finger contact position, size, and pressure characteristic of each user's habits. These patterns often comprise time series of sequences of swipes, and may be learnt using machine learning methods in order to construct a user behavior model for each user, which may be used to verify user identity in a continuous manner during a session.

SUMMARY

It is an object of some embodiments of the present invention to provide a system and a method for mobile behavior biometric verification across different devices.

The foregoing and other objects are achieved by the features of the independent claims. Further implementation forms are apparent from the dependent claims, the description and the figures.

According to a first aspect of the invention, a method for calibrating user behavior based models, in order to enable user validation across different devices, comprising: receiving device usage data generated by monitoring user-device interactions on one or more user devices; employing a user behavior model based on the device usage data and a plurality of values of technical parameters of the one or more devices; receiving a plurality of values of technical parameters of an additional device; receiving device usage data by monitoring user-device interactions on the additional device; and analyzing the device usage data of the additional device by employing the user behavior model to validate an action held using the additional device.

According to a second aspect of the invention, a system for calibrating user behavior based models, in order to enable user validation across different devices, comprising: at least one processor adapted to execute a code for: receiving device usage data generated by monitoring user-device interactions on one or more user devices; employing a user behavior model based on the device usage data and a plurality of values of technical parameters of the one or more devices; receiving a plurality of values of technical parameters of an additional device; receiving device usage data by monitoring user-device interactions on the additional device; and analyzing the device usage data of the additional device by employing the user behavior model to validate an action held using the additional device.

With reference to the first and second aspects, in a first possible implementation of the first and second aspects of the present invention, optionally, wherein the plurality of technical parameters are of a touchscreen.

With reference to the first and second aspects, or the first implementation of the first and second aspects, in a second possible implementation of the first and second aspects of the present invention, optionally, wherein the plurality of values of the technical parameters comprise at least one value from a group consisting of: a horizontal pixels per inch value; a vertical pixels per inch value; a horizontal total pixel count; and a vertical total pixel count.

With reference to the first and second aspects, or the first or second implementations of the first and second aspects, in a third possible implementation of the first and second aspects of the present invention, optionally, wherein employing the user behavior model comprises employing a machine learning model, which is trained to identify user device-interaction patterns, by: calibrating the device usage data according to the technical parameters of the respective one or more devices; extracting a set of predetermined user dependent features from the device usage data; normalizing the set of predetermined user dependent features according to the technical parameters of the respective one or more devices; and training the machine learning model using the set of normalized predetermined user dependent features.

With reference to the first and second aspects, or the first, second, or third implementations of the first and second aspects, in a fourth possible implementation of the first and second aspects of the present invention, optionally, wherein calibrating the device usage data is performed according to the horizontal and vertical dots per inch values.

With reference to the first and second aspects, or the first, second, third, or fourth implementations of the first and second aspects, in a fifth possible implementation of the first and second aspects of the present invention, optionally, wherein calibrating the device usage data further comprises: normalizing touch size and touch pressure values of the device usage data according to values as monitored from a plurality of users interaction with a plurality of devices of identical type as the additional device.

With reference to the first and second aspects, or the first, second, third, fourth, or fifth implementations of the first and second aspects, in a sixth possible implementation of the first and second aspects of the present invention, optionally, wherein normalizing user dependent features further comprises mapping the user dependent features by: duplicating each user dependent feature for each corner of the additional device touchscreen; and calibrating each duplicated feature in relation to each respective corner of the additional device touchscreen.

With reference to the first and second aspects, or the first, second, third, fourth, fifth, or sixth implementations of the first and second aspects, in a seventh possible implementation of the first and second aspects of the present invention, optionally, wherein monitoring user-device interactions is performed by a code installed on the additional different device.

With reference to the first and second aspects, or the first, second, third, fourth, fifth, sixth, or seventh implementations of the first and second aspects, in an eighth possible implementation of the first and second aspects of the present invention, optionally, wherein the code installed on the additional different device comprises a software development kit (SDK) within an application.

With reference to the first and second aspects, or the first, second, third, fourth, fifth, sixth, seventh or eighth implementations of the first and second aspects, in a ninth possible implementation of the first and second aspects of the present invention, optionally, wherein the code installed on the additional different device comprises a script activated by accessing a website.

With reference to the first and second aspects, or the first, second, third, fourth, fifth, sixth, seventh, eighth, or ninth implementations of the first and second aspects, in a tenth possible implementation of the first and second aspects of the present invention, optionally, wherein analyzing the additional device usage data further comprises: generating a user identity score based on an outcome of employing the action held using the additional device on the user behavior model; and comparing the user identity score to a predetermined threshold.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to behavior biometric verification and, more specifically, but not exclusively, to a mobile behavior biometrics system.

According to some embodiments of the present invention there are provided behavior biometrics verification systems and methods in which user interactions with devices such as mobile phones, tablets, and laptops, are recorded, and user actions are verified according to monitored user interactions with the devices.

A problem with verifying user actions may arise when a user switches devices, for example, to an additional device, previously unverified by a behavior biometrics verification system. The previously unverified device may have different technical parameters in comparison to the devices for which user interactions were monitored. For example, the behavior biometrics verification system may recognize users by applying a machine learning process to monitored user interactions, which may include swipe patterns on a mobile touchscreen, with attributes such as pressure and size, in relation to coordinates of the touchscreen corner. As a result, because user interactions patterns depend on technical parameters of a respective device, the machine learning process may not recognize a user while interacting with the previously unverified device, and/or may recognize a valid user as invalid.

Hereby, the phrase 'behavior biometrics' is used interchangeably with 'measurable behavior', the phrase touchscreen is used interchangeably with 'screen', and the word 'model' is used interchangeably with 'process'. Hereby a 'tap' means a user-device interaction which registers exactly one user-device interaction input within a respective device, and a 'touch' means at least one tap. Examples of touches include: user finger swipes and long finger static presses on a device touchscreen.

Previous solutions to measurable behavior verification focus on verifying users on one or more devices which are previously known by a measurable behavior verification system or method. Measurable behavior encompasses user-device interactions which may be quantified, examples of which are time series keystrokes on a keyboard, and time series of finger taps coordinates on device touchscreens.

By contrast, the measurable behavior verification system described herein may identify users interacting with devices previously unverified by the system, provided the users' interactions have been monitored on at least one device. This enables user identification in a seamless universal manner. For example, common scenarios where the system may be useful include instances where mobile device users routinely change devices, and/or where users access secure online accounts via new acquired devices, and/or users who require an improved security on a device.

The manner in which the measurable behavior verification system described herein achieves universal user identification is by introducing four innovative steps divided to two different stages in which device usage data is calibrated and normalized during user behavior model generation and during user verification.

In a first stage, whose purpose is to standardize raw device usage data, monitored device usage data is calibrated according to received device(s) technical parameters: horizontal pixels per inch, vertical pixels per inch, horizontal total pixel count, and vertical total pixel count. Optionally, a statistical calibration is also used according to statistics generated from monitoring a plurality of users over time which use similar devices, in order to calibrate device usage parameters such as tap pressure and tap size, which are not usually present in device technical parameters available for extraction by applications.

Next, user dependent features are extracted from the monitored device usage data. Optionally, some device dependent features are discarded, following a feature engineering phase, which extracts predetermined user related features, such as known patterns which characterize users interactions with touchscreens. Features to be discarded are those characterized by distances between samples of points within swipes, which may be affected by device screen sampling rate which varies between devices. For example, features such as average distance between two samples, or distance between a first and second sample may be discarded. Other features, for example, features related to entire swipe distance (end to end) or time related (i.e. speed), which characterize user behavior, are stored in the measurable behavior verification system in order to generate a user behavior model. Extracted features may include combinations of features characterizing user-device interaction patterns for instance a swipe direction, a gradient, a Euclidean distance between swipes, speed, acceleration, and/or curvature. The system described herein may integrate various machine learning algorithms, for example, distance metrics, neural networks, support vector machines, and random forests.

Note, a problem regarding comparing user-device interaction patterns across different devices may arise, as some of the extracted features differ across different devices even when representing identical actions by an identical user, as screen dimensions and shape may differ across devices, and extracted features are measured relative to a point of origin consisting of an upper left corner of each respective device. Therefore, user behavior may appear very different to a machine learning model as user-device interactions patterns relative to a touchscreen, such as a swipe from the middle of the touchscreen to the lower right, may appear differently even though a holding finger of a right handed person is of the same size. Other user dependent extracted features such as swipe speed may differ between devices as they are measured in pixels which have different sizes and densities.

In order to overcome said problem, extracted features which may be influenced by touchscreen dimensions, are calibrated according to physical dimensions of device(s) touchsceen(s), by duplicating the filtered user features according to each corner of the device(s) touchsceen(s) as a different point of origin. Next, a user behavior model is employed, by training and testing a machine learning model using the duplicated extracted features. Inputting the duplicated features relative to all four corners of the device touchscreen into the machine learning model enables learning user behavior patterns regardless of screen dimensions, which in turn enables the system to compare user behavior patterns between known devices, and devices previously unverified by the system.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Each of the described systems includes and each of the described methods is implemented using a processing circuitry configured to execute a code. The processing circuitry may comprise hardware and firmware and/or software. For example, the processing circuitry may comprise one or more processors and a non-transitory medium connected to the one or more processors and carrying the code. The code, when executed by the one or more processors, causes the system to carry out the operations described herein.

Figure 1:
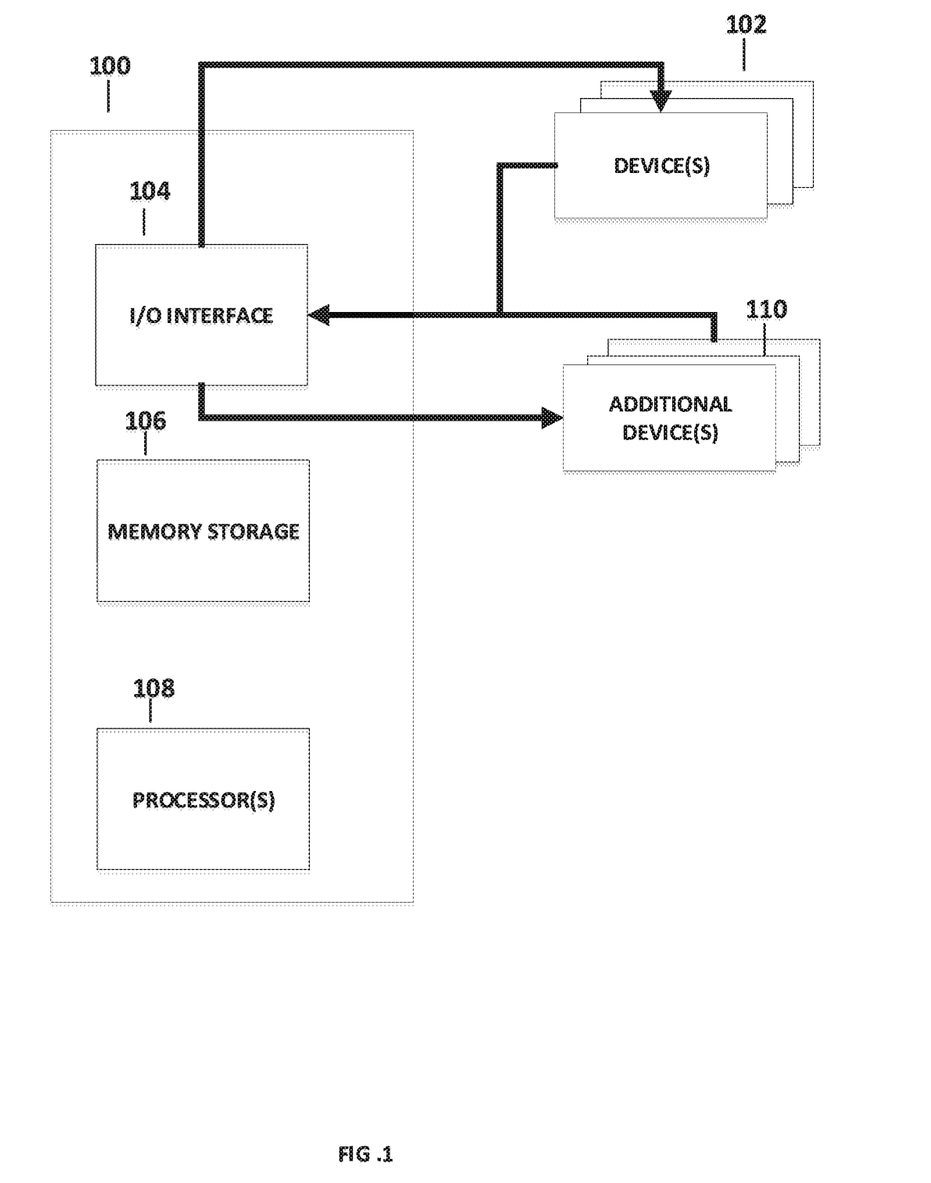
FIG. 1 is an exemplary layout of the various components of a measurable behavior verification system, according to some embodiments of the present invention.

Reference is now made to FIG. 1, which is an exemplary layout of the various components of a measurable behavior verification system, which may be each implemented as software and/or firmware, according to some embodiments of the present invention.

The system 100, includes an I/O interface 104, a memory storage 106 containing the code instructions, and one or more processors 108 adapted to execute the code. In use, the I/O interface 104 receives monitored user-device interactions from one or more devices 102. For example, the user-device interactions are finger swipes on a device touchscreen. The memory storage 106 stores processed user-device interactions in one or more respective user behavior models, which are generated by executing the code by the one or more processors 108. The I/O interface receives user-device interactions from the device(s) 102 and/or from one or more additional, possibly previously unverified, devices 110. Next, the system 100 computes a response to monitored user-device interactions by executing the code, and outputs an outcome of the computation to the devices 102 and/or 110 via the I/O interface 104. This allows validation of users actions on the device(s), and may be used to validate users actions on devices previously unverified by the system, without any additional requirements from users. The system 100 may be used alone as a measurable behavior verification system, or may be incorporated as a subsystem with other measurable behavior verification systems that use sensors such as accelerometers, and/or gyroscopes, and/or light sensors in order to measure and verify users behavior.

Figure 2:
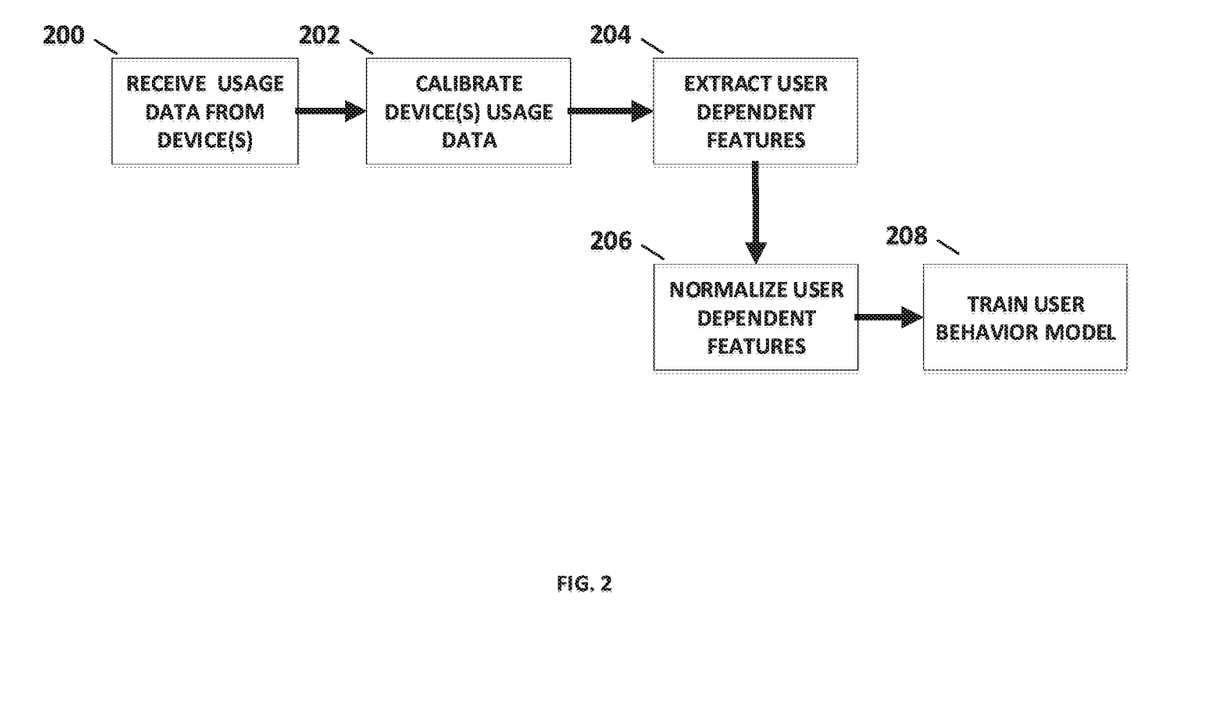
FIG. 2 is an exemplary dataflow of a process of generating a user behavior model according to device usage data, according to some embodiments of the present invention.

Reference is also made to FIG. 2, which is an exemplary dataflow of a process of generating a user behavior model according to device usage data, according to some embodiments of the present invention. First, as shown at 200, the system 100 receives usage data from device(s), by monitoring a user device(s) following registration of one or more device(s) to the system 100, optionally, via the World Wide Web. In addition to usage data, technical parameters of the device(s) are received by the system 100, which include: a horizontal pixels per inch value (XDPI); a vertical pixels per inch value (YDPI); a horizontal total pixel count (XTPC); and a vertical total pixel count (YTPC). The user behavior model may consist of a machine learning algorithm, for example, a decision tree, a support vector machine (SVM), or k-nearest neighbors (KNN), any of which are trained according to the device usage data.

Next, as shown in 202, device(s) usage data is calibrated in order to adapt the usage data to be independent of device(s) touchscreen technical parameters. Each tap by a user on a device touchscreen is typically represented in a record that contains at least five parameters given as a vector: (x, y, P, S, T), which are defined as: x, y coordinates from upper left corner, a tap pressure value P, a tap size value S, and a timestamp T. A user interaction with a device, or a swipe, consists of a sequence of taps, received at a sampling rate associated with the device.

For example, a touch consisting of a sequence of taps includes the following values: [(721, 432, 0.4, 0.0023, 2304540), (718, 435, 0.41, 0.0027, 2304581), (702, 449, 0.42, 0.0025, 2304619), (690, 461, 0.43, 0.0022, 2304658), (685, 465, 0.45, 0.0019, 2304702)]. Such a touch represents a swipe with five points, for example points of contact between a fingertip and screen. In the example, the first tap in the swipe is 721 pixels to the right of the left edge of the screen and 432 pixels down from the upper edge of the screen. The tap size value is 0.4, the touch pressure is 0.0023, and the sampling rate is about 40 milliseconds. The sequence of taps may be identified by the feature extraction process as a left-down swipe as the x coordinates monotonously decline and the y coordinates monotonously grow. In this example the user performing the above swipe performs a second swipe in another device for instance as recorded in a record storing the following values: [(901, 512, 0.11, 0.0072, 30825), (919, 519, 0.12, 0.0087, 30854), (926, 525, 0.14, 0.0065, 30883), (937, 539, 0.15, 0.0075, 30917), (950, 549, 0.18, 0.0066, 30946), (961, 566, 0.21, 0.0053, 30975), (974, 572, 0.22, 0.0061, 31007)].

This second swipe is different from the first swipe. One difference reflected by this example is a different number of tap points in the touch, due to a difference in the sampling rate of the two devices that generates the different amount of tap points. A second difference is visible in the x, y coordinates, due to different screen specifications such as the screen physical dimensions, division to pixels, the size of each pixel, and the distance between pixels. These differences may influence extracted features such as the distance between the first and the last point in a swipe. Pressure and size values may also vary between devices for identical swipes, however addressing differences between pressure and size may not be possible based solely on the technical parameters of the device received in 200.

Calibration of data usage according to a monitored device in 202 is performed as follows. First, x, y coordinates of taps are calibrated according to received XDPI, YDPI parameters of the device as depicted in 200. The calibration may be performed by dividing each x, y coordinate of each tap point by the XDPI, YDPI values respectively. Note that since device parameters are received in XDPI, YDPI values, the division calibrates x, y coordinates to inch units. Next, optionally, in order to normalize pressure P, and size S values, users device data is collected over time pertaining to respective monitored device types. Next, P and S values within the data usage is calibrated according to a computed mean and standard deviation of the collected P and S values, for example by assigning a percentile to each P and S value relative to the computed mean and standard deviation.

Next, as shown in 204, a set of features are extract from the received vector(s), by the processor(s) 108 which execute a computation contained in the code instructions. The set of features are predetermined combinations of, for example, swipe direction, gradient, Euclidean distances, speed, acceleration, and curvature computed from a representation of the sequence of vector(s), which characterize swipe patterns of users.

Next, as shown in 206, a subset of extracted features are normalized in relation to four corners of the touchscreen, according to the respective device(s) technical parameters, for example by duplication of each feature to each corner which is used as a reference as a point of origin for each duplicated feature.

Extracted features are duplicated for a purpose of configuring the user behavior model in a manner nondependent on device type or device screen specifications. Note, that the dimensions of each respective touchscreen are computable from XDPI, YDPI, XTPC, and YTPC. The extracted features that are normalized are those that are influenced by device touchscreen dimensions, for example, when swipe speed is a feature included in the set of extracted features, then swipe speed is not normalized, since swipe speed is not usually less influenced by touchscreen dimensions, and depends more on the users habits.

Next, as shown in 208, the normalized and non-normalized extracted features are used to train a user behavior model. According to some embodiments of the present invention, the user behavior model consists of a learning model such as a decision tree, a Support Vector Machine, a neural network, and/or one-class classification models such as Local outlier factor, or Isolation forest, in order to learn behavioral patterns in the features extracted from the user-device interaction data.

Figure 3:
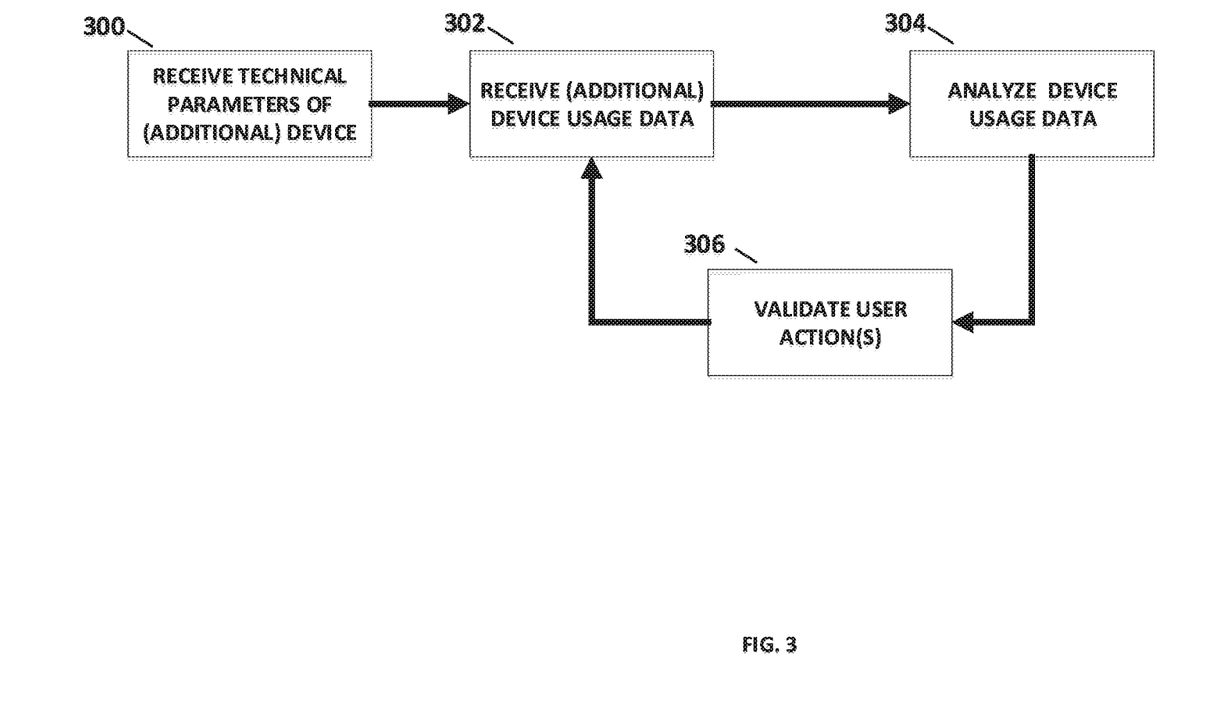
FIG. 3 is an exemplary dataflow of a process of validating one or more actions performed by a user on a device, according to some embodiments of the present invention.

Reference is also made to FIG. 3, which is an exemplary dataflow of a process of validating one or more actions performed by a user on a device, which may be an additional device previously unverified by the system 100, or may be a device for which the system has learnt the respective user behavior by training the user behavior model as depicted in FIG. 2.

First, as shown in 300, the system 100 receives technical parameters of a device(s) via the I/O interface 104. Next, as shown in 302, device(s) usage data is received over time by monitoring the additional device(s). Next, as shown in 304, the device(s) usage data is analyzed, according to the user behavior model configured in 206. Next, as shown in 306, one or more user actions contained in the device usage data are validated according to an outcome of the analysis. According to some embodiments of the present invention, validation of user actions consists of comparing an outcome of the analysis to a predefined user identity threshold, such as an outcome of the analysis higher than the threshold confirms a user identity by the system, and an outcome lower than the threshold may lead the system to notify the respective device of a possible security breach in a predetermined manner via the I/O interface 104.

Figure 4:
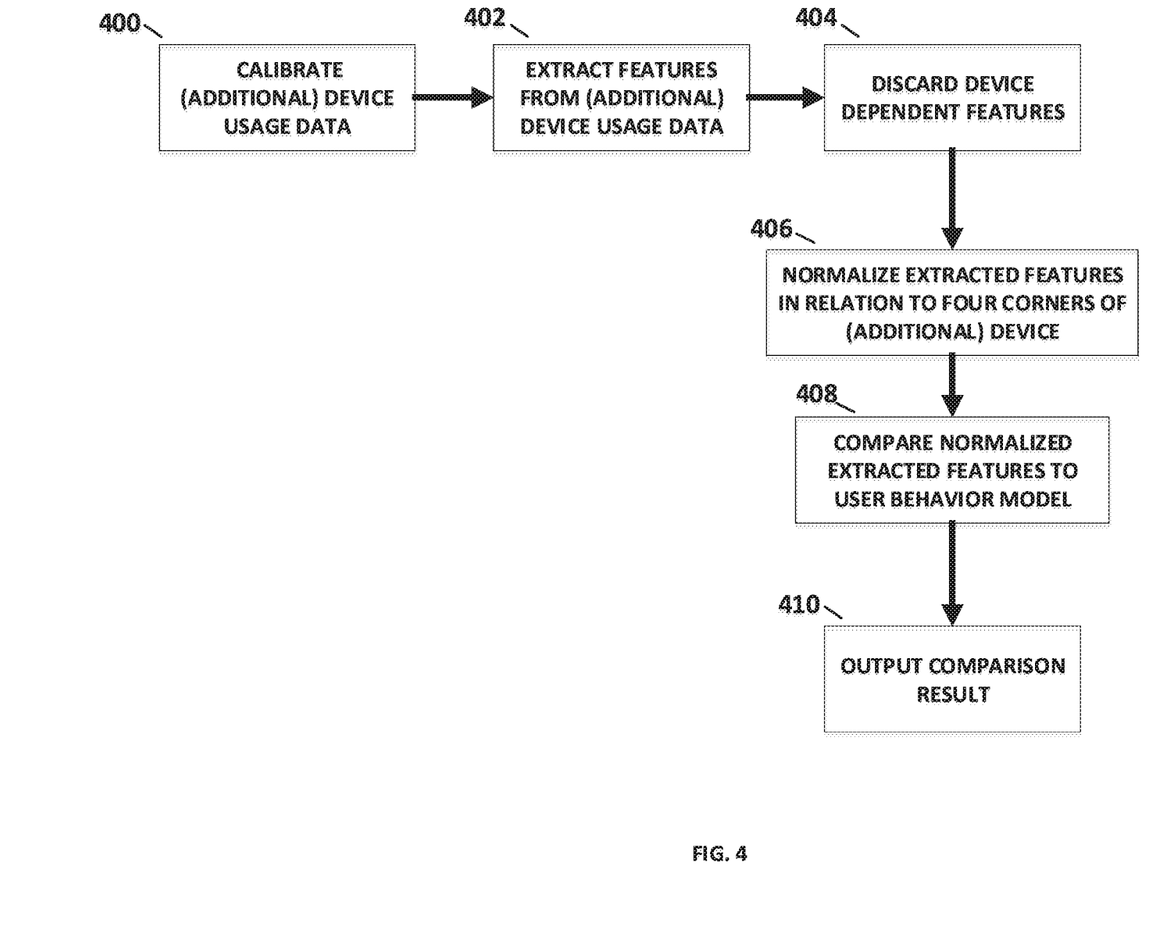
FIG. 4 is an exemplary dataflow for a process of analyzing device usage data by extracting and normalizing user dependent features, according to some embodiments of the present invention.

Reference is also made to FIG. 4, which is an exemplary dataflow for a process of analyzing device usage data by extracting and normalizing user dependent features as depicted in 304, according to some embodiments of the present invention. First, as shown in 400, user interaction vector(s), for example, a user swipe action on a touchscreen consists of a sequence $(x_i, y_i, P_i, S_i, T_i)$, i=1 . . . N with ascending timestamps $T_i$, are calibrated as described for 202.

Next, as shown in 402, a set of features are extract from the received vector(s), in an identical manner as described for 204.

Next, as shown in 404, certain device dependent features may be discarded, which are those characterized by distances between samples of points within swipes, as previously detailed.

Next, as shown in 406, extracted features are normalized in relation to four corners in an identical manner to that described for 206.

Next, as shown in 408, according to some embodiments of the present invention, a user identity score is computed for the extracted features consisting of an outcome of inputting the extracted features into the user behavior model. For example, the user identity score may be defined as an average classification score of the swipes in a session on a scale between 0-100.

Next, as shown in 410, the comparison result is outputted to 310 for a purpose of validating a respective user identity.

Figure 5:
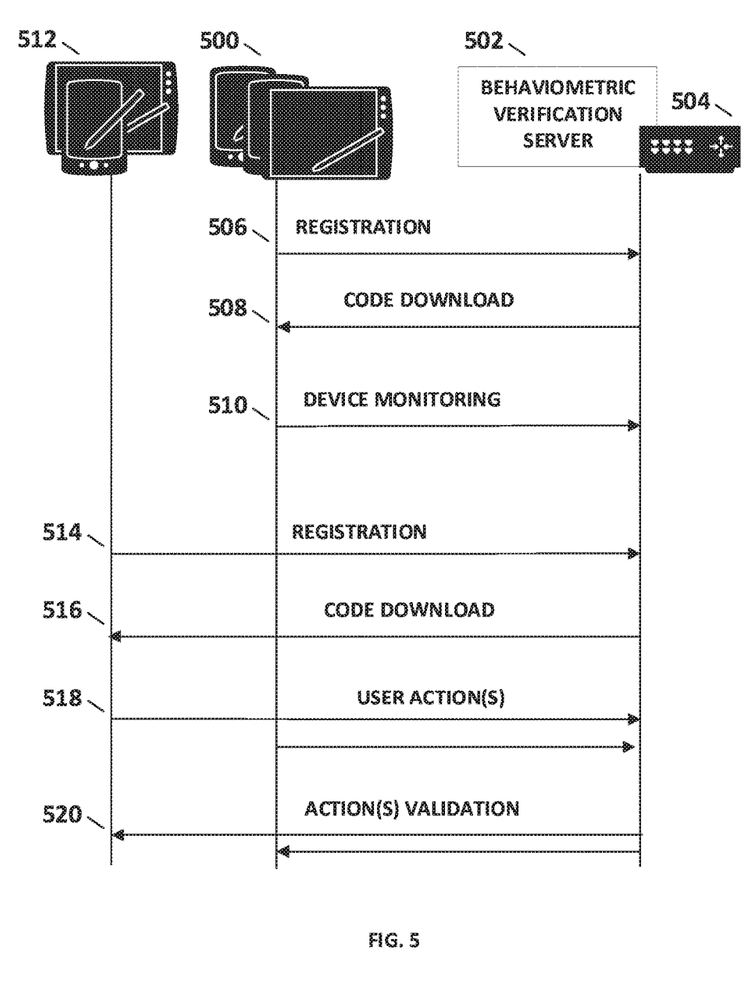
FIG. 5 is an exemplary dataflow for user interaction with the mobile measurable behavior verification system, according to some embodiments of the present invention.

Reference is also made to FIG. 5, which is an exemplary dataflow for user interaction with the mobile measurable behavior verification system, from user registration to user validation, according to some embodiments of the present invention.

First, a user, owning one or more device(s) 500, agrees, or initiates, access to the mobile measurable behavior verification system 502, via a computer network 504, for example via the World Wide Web using a wireless network. For example, the user may desire an improved security on the device(s) or on additional device(s), for accessing online accounts, such as bank accounts, or government websites. Next, as shown in 506, the user registers the device(s) with the system 502. Next, as shown in 508, the registered device(s) downloads and installs a code for continuously monitoring user-device interactions by the system 502. Alternatively, the code may be executed in a Web browser, and may be executed, for example, as a Javascript code, thus negating a need for code installation on the device(s). Next, as shown in 510, user-device interactions on the registered device(s) 500 are monitored over time by the system 502, as user-device interactions monitored by the code are continuously sent to the system 502 via the computer network.

Next, the user may use an additional device 512, for which the users actions may be previously unverified by the system 502. Next, as shown in 514, 516, the user registers the device 512, downloads and installs the monitoring code.

Next, as shown in 518, the user performs an action on the device, which may be a security sensitive action on one of the device(s) 500, or on the additional device 512. An example of an action may be a user input of a username and password to a GUI of an online bank service via a web browser or download a dedicated bank app. Next, as shown in 520, the system 502 validates the user action to be either valid or not, based on a user identification score generated by the system, which may be derived for each action based on an outcome of the user behavior model in processing the action. Note that the validation process is performed on the measurable behavior verification server, whereas the device (s) receive an identity score for the respective action(s).

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term measurable behavior is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for calibrating user behavior based models, in order to enable user validation across different devices, comprising:
   receiving device usage data generated by monitoring user-device interactions on one or more user devices;
   employing a user behavior model based on:
      a sampling rate of the one or more device, wherein the sampling rate of each device of the one or more devices, resulting in a different amount of tap points for each device of the one or more devices; or
      the device usage data and a plurality of values of technical parameters of a touchscreen of the one or more devices, wherein the plurality of values of the technical parameters comprise at least one value from a group consisting of:
      a horizontal pixels per inch value;
      a vetical pixels per inch value;
      a horizontal total pixel count; and
      a vertical total pixel count;
   receiving device usage data by monitoring user-device interactions on the additional device; and
   analyzing the device usage data of the additional device by employing the user behavior model to validate an action held using the additional device;
   wherein employing the user behavior model comprises employing a machine learning model, which is trained to identify user-device interaction patterns, by:
   calibrating the device usage data according to the technical parameters of the respective one or more devices;
   extracting a set of predetermined user dependent features from the device usage data;
   normalizing a set of predetermined user dependent features according to the technical parameters of the respective one or more devices; and
   training the machine learning model using the set of normalized predetermined user dependent features;
   wherein normalizing user dependent features further comprises mapping the user dependent features by:
   discarding user dependent features which depend on device specifications, whereas the discarding is performed based on predetermined criteria, in case a respective device is previously unknown;
   duplicating each user dependent feature for each corner of the additional device touchscreen; and
   calibrating each duplicated feature in relation to each respective corner of the additional device touchscreen.

2. The method of claim 1, wherein calibrating the device usage data is performed according to the horizontal and vertical dots per inch values.

3. The method of claim 2, wherein calibrating the device usage data further comprises:
   normalizing touch size and touch pressure values of the device usage data according to values as monitored from a plurality of user's interactions with a plurality of devices of identical type as the additional device.

4. The method of claim 1, wherein monitoring user-device interactions is performed by a code installed on the additional different device.

5. The method of claim 4, wherein the code installed on the additional different device comprises a software development kit (SDK) within an application.

6. The method of claim 4, wherein the code installed on the additional different device comprises a script activated by accessing a website.

7. The method of claim 1, wherein analyzing the additional device usage data further comprises:
   generating a user identity score based on an outcome of employing the user behavior model; and
   validating the action held using the additional device by comparing the user identity score to a predetermined threshold.

8. A system for calibrating user behavior based models, in order to enable user validation across different devices, comprising:
   a non-transitory medium connected to one or more processors adapted to execute a code for:
   receiving device usage data generated by monitoring user-device interactions on one or more user devices;
   employing a user behavior model based on:
      a sampling rate of the one or more devices, wherein the sampling rate of each device of the one or more devices, resulting in a different amount of tap points for each device of the one or more devices; or
      the device usage data and a plurality of values of technical parameters of a touchscreen of the one or more devices, wherein the plurality of values of the technical parameters comprise at least one value from a group consisting of:
   a horizontal pixels per inch value;
   a vertical pixels per inch value;
   a horizontal total pixel count; and
   a vertical total pixel count;
   receiving a plurality of values of technical parameters of an additional device;
   receiving device usage data by monitoring user-device interactions on the additional device; and
   analyzing the device usage data of the additional device by employing the user behavior model to validate an action held using the additional device;
   wherein employing the user behavior model comprises employing a machine learning model, which is trained to identify user-device interaction patterns, by:
   calibrating the device usage data according to the technical parameters of the respective one or more devices;
   extracting a set of predetermined user dependent features from the device usage data;
   normalizing a set of predetermined user dependent features according to the technical parameters of the respective one or more devices; and
   training the machine learning model using the set of normalized predetermined user dependent features;
   wherein normalizing user dependent features further comprises mapping the user dependent features by:
   discarding user dependent features which depend on device specifications, whereas the discarding is performed based on predetermined criteria, in case a respective device is previously unknown;
   duplicating each user dependent feature for each corner of the additional device touchscreen; and
   calibrating each duplicated feature in relation to each respective corner of the additional device touchscreen.

9. The system of claim 8, wherein employing the user behavior model comprises employing a machine learning model, which is trained to identify user-device interaction patterns, by:
   calibrating the device usage data according to the technical parameters of the respective one or more devices;
   extracting a set of predetermined user dependent features from the device usage data;
   normalizing the set of predetermined user dependent features according to the technical parameters of the respective one or more devices; and
   training the machine learning model using the set of normalized predetermined user dependent features.

10. The system of claim 9, wherein calibrating the device usage data is performed according to the horizontal and vertical dots per inch values.

11. The system of claim 10, wherein calibrating the device usage data further comprises:
    normalizing touch size and touch pressure values of the device usage data according to values as monitored from a plurality of user's interaction with a plurality of devices of identical type as the additional device.

12. The system of claim 9, wherein normalizing user dependent features further comprises mapping the user dependent features by:
    discarding user dependent features which depend on device specifications, whereas the discarding is performed based on predetermined criteria, in case a respective device is previously unknown;
    duplicating each user dependent feature for each corner of the additional device touchscreen; and
    calibrating each duplicated feature in relation to each respective corner of the additional device touchscreen.

13. The system of claim 8, wherein monitoring user-device interactions is performed by a code installed on the additional different device.

14. The system of claim 13, wherein the code installed on the additional different device comprises a software development kit (SDK) within an application.

15. The system of claim 13, wherein the code installed on the additional different device comprises a script activated by accessing a website.

16. The system of claim 8, wherein analyzing the additional device usage data further comprises:
    generating a user identity score based on an outcome of employing the user behavior model; and
    validating the action held using the additional device by comparing the user identity score to a predetermined threshold.

17. A method for calibrating user behavior based models, in order to enable user validation across different devices, comprising:
    receiving device usage data generated by monitoring user-device interactions on one or more user devices;
    employing a user behavior model based on:
       a sampling rate of the one or more device, wherein the sampling rate of each device of the one or more devices, resulting in a different amount of tap points for each device of the one or more devices; or
       the device usage data and a plurality of values of technical parameters of a touchscreen of the one or more devices;
    receiving a plurality of values of technical parameters of an additional device;
    receiving device usage data by monitoring user-device interactions on the additional device; and
    analyzing the device usage data of the additional device by employing the user behavior model to validate an action held using the additional device;
    wherein employing the user behavior model comprises employing a machine learning model, which is trained to identify user-device interaction patterns, by:
    calibrating the device usage data according to the technical parameters of the respective one or more devices;

extracting a set of predetermined user dependent features from the device usage data;
normalizing a set of predetermined user dependent features according to the technical parameters of the respective one or more devices; and
training the machine learning model using the set of normalized predetermined user dependent features;
wherein normalizing user dependent features further comprises mapping the user dependent features by:
duplicating each user dependent feature for each corner of the additional device touchscreen; and
calibrating each duplicated feature in relation to each respective corner of the additional device touchscreen; and
discarding user dependent features which depend on device specifications, whereas the discarding is performed based on predetermined criteria, in case a respective device is previously unknown.

* * * * *